S. SMITH.
Saw Set.
No. 25,681.
Patented Oct. 4, 1859.
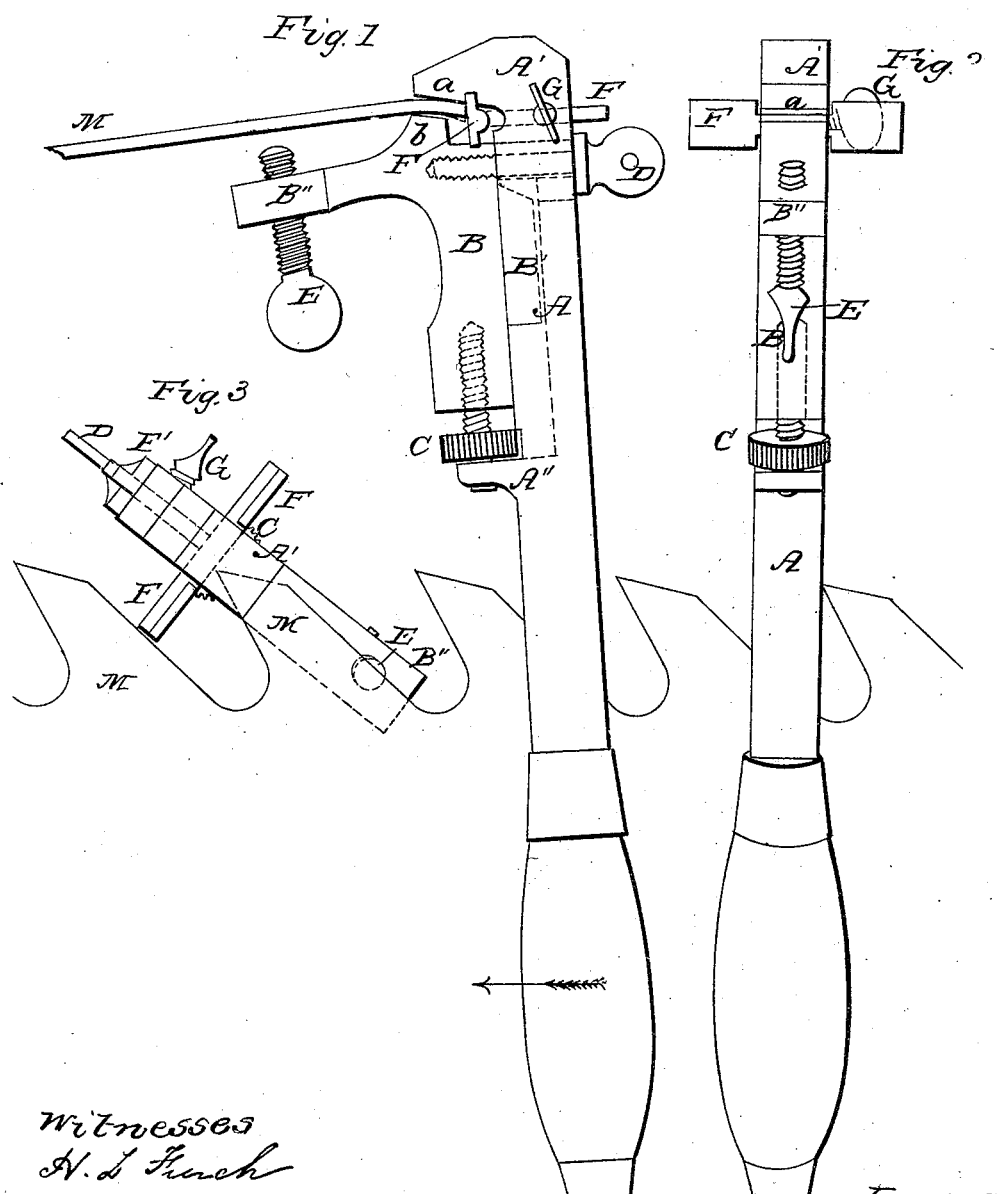
Witnesses
H. L. Finch
C. H. Hotchkiss
Inventor
Seymour Smith

UNITED STATES PATENT OFFICE.

SEYMOUR SMITH, OF SHARON, CONNECTICUT.

SAW-SET.

Specification of Letters Patent No. 25,681, dated October 4, 1859.

*To all whom it may concern:*

Be it known that I, SEYMOUR SMITH, of Sharon, in the county of Litchfield and State of Connecticut, have invented a new and Improved Set for Mill-Saws; and I do hereby declare that the following is a full, clear, and exact description of the same, reference being had to the accompanying drawings, and to the letters of reference denoted thereon, in which—

Figure 1 is a side view, Fig. 2 is a front view, and Fig. 3 an end view, of the tool complete.

Similar letters of reference denote like parts in both the drawings.

The nature of my invention consists in the arrangement of an angular or V-shaped stock or body, an adjustable slide carrying a face parallel to the angular portion thereof, with suitable means for gaging the angularity of the teeth, and an adjustable gage extending across to gage the depth of the nip or set, the whole mounted substantially in the manner and so as to be operated as shown below.

To enable others skilled in the art to make and use my invention I will proceed to describe it by the aid of the drawings.

The general form of my set resembles that of a screw wrench.

A is a shank of cast iron, steel, or other suitable material having a head A′ and projection A″ as represented. The space between is partially filled by the slide B which may be moved up toward A′ by turning the screw C, and firmly secured in any position desired by the screw D. A rib B′ projects from B into a corresponding channel in the face of A as shown by the dotted lines, and serves to guide and support it. An arm B″ extends in an opposite direction and carries a screw E which gages the angularity of the teeth of the saw M as represented. The steam is applied by the hand in the direction shown by the red arrow.

The under side or face $a$ of the head A′ is fair or plane throughout its whole extent. The corresponding upper face $b$ of the slide B is parallel thereto for a certain space and the remainder is shouldered or recessed as represented. This allows the points of the teeth M to be upset and thickened on their outset sides as shown by the red lines in Fig. 1. In the position represented stands the gage F to which is attached the stem F′ extending into a hole in A and pinched or confined by the screw G. By slacking G the gage F may be set forward or back to enable the tool to take a deeper or shallower hold of the teeth at pleasure; by slacking D and turning C the slide B may be set for any required thickness of saw while the faces $a$ and $b$ are always parallel; by turning E the teeth may be set to any angle required; and either of these several operations is performed without affecting the adjustment, or in any manner changing the relations, of the other several parts.

There are saw sets in which an independently adjustable gage is employed to determine the depth to which the tool may act on the teeth, but as heretofore arranged such gages do not stand in the aperture and meet the teeth being operated on but stand at the sides to meet the other teeth and cannot be made to produce the effect of my invention.

In setting mill saws the set must act at an angle to the line of the edge as shown in Fig. 3 in order to bend the points of the teeth properly, and in my invention this is allowed, as the gage extends across the aperture and meets the point of the single tooth. My gage F may also be made of such length of face that its end touches the inclined edge of the next tooth and aids in rapidly applying the set to the several teeth. It is obvious that the length of F, represented in the drawings, will serve thus to guide the set on a number of different saws because the faces $a$ and $b$ are of considerable width.

Spare gages F of greater or less length of face can be kept for extraordinary sizes of saws if any such are in the mill. My arrangement of the parts A and B also imparts great rigidity to the tool and causes the strain to be applied by the hand in the direction which induces the least twisting strain on the saw plate. This point is so important that the instrument universally employed for setting mill saws down to the present time has been a single piece of metal with a recess or recesses in its side to fit the tooth. This tool is shown by diagram appended to the darwings.

Having now fully described my improved set I do not claim any of the several parts separately considered, but

What I claim as new, and desire to secure by Letters Patent, is—

The mill saw set herein described as a new article of manufacture the several parts A B and F being constructed and arranged substantially in the manner and so as to be operated as herein set forth.

SEYMOUR SMITH.

Witnesses:
ELIAKIM S. STODDARD, Jr.,
ABEL C. WOODWARD.